Patented July 18, 1950

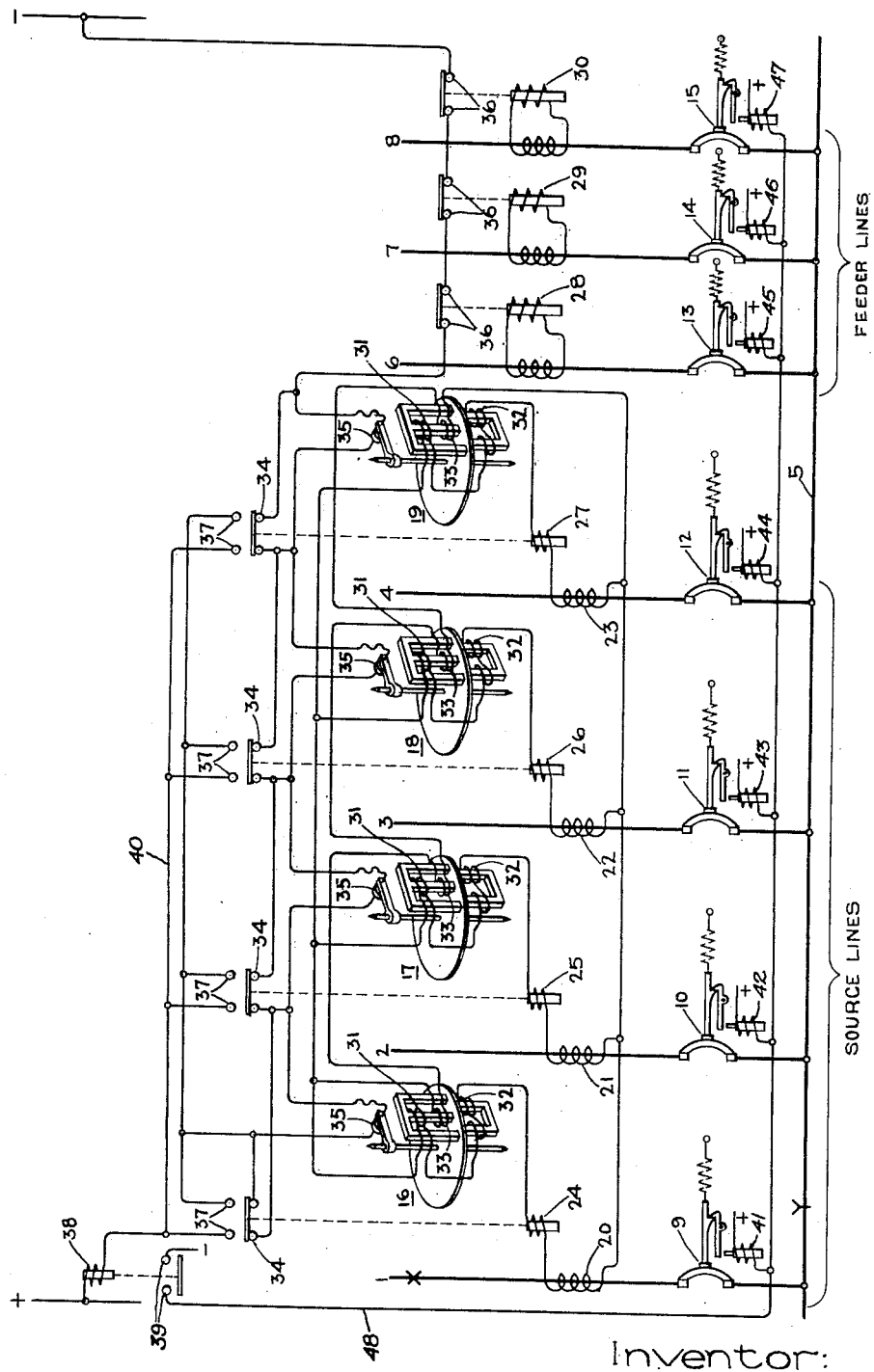

2,515,784

UNITED STATES PATENT OFFICE 2,515,784

BUS BAR PROTECTION SYSTEM WITH CURRENT POLARIZED DIRECTIONAL CURRENT RELAY

Andrew J. McConnell, Delmar, N. Y., assignor to General Electric Company, a corporation of New York Application January 27, 1949, Serial No. 73,157

4 Claims. (Cl. 175—294)

1

This invention relates to electrical relay systems and more particularly to directional relay protection of a bus bar connected to a plurality of electrical power source and feeder lines.

One conventional method of polarization of directional relays in polyphase systems employs voltage derived from two phase-to-phase potential transformers or a like source.

However, when a directional relay is polarized by means of phase-to-phase potential, directional action may be poor during an electrical fault which causes a low voltage and a high current to be applied to the relay. For example, the contacts may close when they should stay open, and vice versa.

In such a case, a second conventional method utilizing current polarization is desirable. However, this method requires a dependable local source of short-circuit current, such as a generator.

It is an object of my invention to provide a system of current polarization which provides directional protection for a bus bar supplied with electrical energy from a plurality of power source lines and which system is not dependent upon a local source of short-circuit current being in service at all times.

In general, my invention comprises a system of relays each of which is made directional to cause tripping of the appropriate interrupters for an internal fault on the bus bar by adding together currents derived from each source line and sending the sum of these derived currents through one winding of the relay to be polarized and also sending a current derived from the current of a particular source line to supply an oppositely wound winding positioned on the same core as the one winding so that the polarizing effect in ampere turns, or flux, is as if one winding were used on the core and the derived currents subtracted before they entered this winding.

For a complete understanding of my invention, reference should be had to the following specification and the accompanying drawing wherein the single figure is a diagrammatic view of an electrical power system showing the application of my invention thereto.

Referring to the drawing in detail, I have shown one phase only of four power source lines 1, 2, 3 and 4, a bus bar 5, and three feeder circuits 6, 7 and 8. The remaining two phases have been omitted to simplify the drawing. Power source lines 1, 2, 3 and 4 are respectively connected to bus bar 5 through circuit breakers 9, 10, 11 and 12. Feeder lines 6, 7 and 8 are respectively connected to bus bar 5 through circuit breakers 13, 14 and 15. It is an object of my invention to provide directional relay protection for an electrical fault on bus bar 5 without the use of voltage polarization and without dependence upon a local source of short-circuit current, such as a generator, being in service at all times to provide current polarization.

To accomplish this result, I provide directional relays 16, 17, 18 and 19, respectively in line circuits 1, 2, 3 and 4. Relays 16 to 19, inclusive, are provided with contacts 35 which may be open or closed depending upon circuit conditions. Similar relays would have to be provided in at least one other phase of lines 1-4 to provide for phase-to-phase faults but are not necessary for an understanding of my invention. Relays 16-19 are supplied with electrical power by current transformers 20, 21, 22 and 23. I also provide four overcurrent relays 24, 25, 26 and 27 connected, respectively, to current transformers 20, 21, 22 and 23. Overcurrent relays 24-27 have normally closed contacts 34 and normally open contacts 37. In feeder circuits 6, 7 and 8, I provide respective overcurrent relays 28, 29 and 30 having normally closed contacts 36. The function of overcurrent relays 24 to 27, inclusive, and 28 to 30, inclusive, will be discussed in detail later.

Directional relays 16, 17, 18 and 19 are each provided with three windings 31, 32 and 33. Windings 31 and 32 are connected in series and in series with the secondary winding of the current transformer associated with the respective relay. Windings 33 of relays 16-19 are connected in series circuit and are supplied with a current proportional to the sum of the currents entering bus bar 5 from the power source lines 1-4. Windings 33 and 31 of each relay are positioned on the same core, have the same number of turns, and are oppositely wound. Contacts 34 of relays 24 to 27, inclusive, and contacts 36 of relays 28 to 30, inclusive, are connected in series with contacts 37 of relays 24 to 27, inclusive, which contacts are connected in parallel, and with an auxiliary relay 38 having a normally open contact 39. Contacts 35 of directional relays 16 to 19, inclusive, are connected in parallel with associated contacts 34 of respective overcurrent relays 24 to 27, inclusive.

The series parallel circuit thus formed of contacts 34 to 37, inclusive, and relay 38 is connected to a source of direct current power as indicated in the drawing and will be hereinafter referred to as the direct current control circuit 40. Circuit breakers 9 to 15, inclusive, are provided respectively with trip coils 41 to 47, inclusive. Trip coils 41 to 47, inclusive, are electrically interconnected in parallel with each other and in series with contact 39 of auxiliary relay 38 forming a series parallel circuit which is connected to a direct current power source as indicated. The circuit thus formed will hereinafter be referred to as the trip circuit 48. In operation, when current is allowed to pass through the direct current control circuit 40, relay 38 is energized, thereby closing its contact 39 and tripping circuit breakers 9 to 15, inclusive, through the medium of trip circuit 48.

Considering the operation of directional relays 16 to 19, inclusive, the effect of having windings 31 and 33 oppositely wound with the same number of turns and on the same core is to produce the equivalent in ampere turns, flux, or relay torque of a single winding in which the currents are subtracted before they enter the winding. Therefore, I employ the combined effect of windings 31 and 33 to produce polarization of relays 16 to 19, inclusive. This combined effect is the equivalent of polarization by means of the sum of the currents entering bus bar 5 from all the source lines except the source line to which the relay is connected. For example, relay 16 is in effect polarized by the currents entering bus bar 5 from sources connected to circuits 2, 3 and 4. That is, winding 33 carries a current proportional to the total current from all sources connected to circuits 1 to 4, inclusive. The current from the source connected to circuit 1 is in effect subtracted from that total by flowing in oppositely wound winding 31. Winding 32 functions as an operational winding, that is, the relay torque is proportional to the product of the current in winding 32 and the net polarizing current in windings 31 and 33.

Considering now the effect of relays 16, 17, 18 and 19 for various conditions on the power source lines and bus bar, assume first a condition of no fault at any point and currents flowing into bus 5 from power source lines 1 to 4, inclusive. Under this condition, the secondary winding current of the current transformer 20 of line 1, for example, flows from that secondary winding through windings 33 of all relays, thence through windings 31 and 32, in order, of relay 16 and back to current transformer 20. In the winding 33 of each of relays 16 to 19, inclusive, the sum of the secondary currents of the current transformers 20, 21, 22 and 23 flows in a direction tending to create a flux opposed to that created by winding 31 of the relay. The result is the effect which would be produced were windings 31 and 33 combined into one winding and the current of winding 31 subtracted from the sum of the currents which flow through windings 33. Under such a condition, the relay is designed to have torque in the contact closing direction, that is, contact 35 of relay 16 is closed. Although this is the direction for energizing auxiliary relay 38 and thereby causing circuit breakers 9 to 15, inclusive, to be tripped, such tripping is prevented by open contacts 37 of over-current relays 24-27. All of the contacts 37 are open because none of the overcurrent relays 24 to 27, inclusive, operate under a condition of no fault. Therefore, for a condition of no fault, circuit breakers 9-15 remain closed.

Next, considering a fault on one of the power source lines sufficient to operate an overcurrent relay such as relay 24. For example, consider such a fault on line 1 at point X. Under this condition, a current flows in winding 32 of relay 16 in a direction opposite to the direction of flow under a condition of no fault, that is, current flows from winding 32 toward winding 31. The combined effect of the currents flowing in windings 31 and 33 is the same as for the no-fault condition since windings 31 and 33 effectively conduct the currents of circuits 2, 3 and 4, the directions of which currents are the same as for the no-fault condition. However, the direction of current in operational winding 32 having been reversed, relay 16 opens its contacts 35. Therefore, for a fault at X sufficient to operate relay 24, relay 24 by its operation opens its contact 34 and closes its contact 37. Moreover, since current has been reversed in the operational winding 32 of relay 16, that relay opens its contact 35. Relays 25-27 have not operated because the fault is in line 1. Thus, the control circuit 40 is interrupted at all possible closing points and circuit breakers 9-15 remain closed. Although relays 17, 18 and 19 also have torque in the contact opening direction, the direct current control circuit 40 does not require that they also open their contacts to prevent tripping. That is, when only overload relay 24 has operated, as in the case of a fault at X, control circuit 40 will be closed only if contact 35 of relay 16 is closed. If the fault at X is not sufficient to operate overcurrent relay 24, then all of the contacts 37 are open and control circuit 40 is interrupted, thereby preventing the tripping of circuit breakers 9-15. Therefore, for any fault on one of the power source lines, the breakers 9-15 remain closed.

However, should an internal fault occur on bus bar 5, for example, at Y, then conditions are the same as for the no-fault condition except for current magnitude. The torques of relays 16 to 19, inclusive, are all in the contact closing directions, that is, contacts 35 are all closed, and this fact, together with overcurrent in any one circuit, causes one of the contacts 37 to close thereby closing the direct current control circuit 40 to energize auxiliary relay 38, which upon being energized closes its contact 39 thereby energizing the trip circuit 48 to trip circuit breakers 9 to 15, inclusive.

The foregoing circuits, therefore, provide directional protection of the system for an electric fault on bus bar 5 without the use of voltage polarization or the requirement of a dependable local source of short-circuit current.

This effect can also be seen mathematically as shown below:

Let $I_1$, $I_2$, etc. be the secondary currents of current transformers 20, 21, etc. neglecting exciting current.

$I_T$ be the sum of secondary currents.

$I_{P1}$, $I_{P2}$, etc. be the equivalent polarizing current as supplied in windings 31 and 33 of relays 16, 17, etc.

then $$I_{P1} = I_T - I_1 = (I_1 + I_2 \ldots) - (I_1)$$

The torque of relay 16 then is a function of $I_1(I_T - I_1)$; in relay 17, $I_2(I_T - I_2)$; etc.

The reason for providing a normally closed contact 34 on each of the overcurrent relays 24 to 27, inclusive, in parallel with each corresponding directional relay contact 35 is to prevent the direct current circuit 40 from opening unless the overcurrent relay, as well as the directional relay, opens its contacts. This prevents inadvertent opening of the direct current circuit on an internal fault in the event that the source circuit was temporarily not a source, in which case load current might be flowing out of the bus bar into the source circuit. This can occur, for example, with a phase-to-phase bus bar fault. The load current in circuit 1, for example, acting with the polarizing current caused by the fault, could operate the contact 35 of directional relay 16, thereby opening control circuit 40 and preventing tripping of breakers 9–15. The overcurrent relay 24 prevents such action from occurring by maintaining its contact 34 closed. Contacts 36 of overcurrent relays 28, 29 and 30 prevent tripping of circuit breakers 9 to 15, inclusive, in the event of a fault on any feeder 6, 7 or 8. For example, relay 28 opens its contact 36 for a fault on feeder circuit 6 thereby opening control circuit 40. Normally open contacts 37 of overcurrent relays 24, 25, 26 and 27 prevent tripping of the breakers during normal conditions of no fault.

In summarizing the operation of the complete system, under a normal condition of no fault contacts 34 and 36 are closed. Contacts 35 may or may not be closed. Operation of auxiliary relay 38, which would energize the trip circuit 48 and thereby open the bus circuit breakers 9 to 15, inclusive, is prevented by open contacts 37.

For a fault on a feeder, such as 6, contacts 36 of overcurrent relay 28 open thereby opening control circuit 40 and preventing tripping of circuit breakers 9 to 15, inclusive.

For a fault on a source circuit, such as 1, contacts 34 of overcurrent relay 24 and contacts 35 of directional relay 16 open and thereby opening control circuit 40 and preventing tripping of circuit breakers 9 to 15, inclusive.

For fault on the bus bar 5, contacts 37 of one or more of overcurrent relays 24 to 27, inclusive, close. That is, for a fault on bus bar 5, at least one of the overcurrent relays 24 to 27 operates. Contacts 35 of directional relays 16 to 19, inclusive, remain closed if there is sufficient current to operate overcurrent relays 24 to 27, inclusive. That is, if there is sufficient current to operate overcurrent relay 24, for example, then contact 35 of its associated directional relay 16 remains closed. If there is not sufficient current to operate an overcurrent relay such as 24, the direct current control circuit 40 remains closed since contact 34 of overcurrent relay 24 will remain closed, thus maintaining the circuit closed regardless of the position of contact 35 of directional relay 16. Therefore, in either case, auxiliary relay 38 is energized and this relay, in turn, opens the bus circuit breakers 9 to 15, inclusive. As an example illustrative of the above conditions, assume there is sufficient current to operate overload relay 24 only and none of the other overload relays 25 to 27, inclusive, operates, then contact 37 of overload relay 24 closes and contacts 34 of relays 25 to 27, inclusive, remain closed. Therefore, control circuit 40 is complete to relay 38 through contacts 36 of overcurrent relays 28 to 30, inclusive, contacts 34 of overcurrent relays 25 to 27, inclusive, contact 35 of relay 16 and contact 37 of overcurrent relay 24. As a second example, assume there is sufficient current to operate all of the overcurrent relays 24 to 27, inclusive. In such case, all of the contacts 37 are closed, all of the contacts 34 are open, and all of the contacts 35 are closed. Control circuit 40 is then complete to relay 38 through contacts 36, 35 and 37 thereby energizing relay 38 to trip circuit breakers 9 to 15, inclusive. Therefore, for a fault on bus bar 5, one or more of the overcurrent relays 24 to 27, inclusive, close and the direct current control circuit 40 is completed to auxiliary relay 38 which upon being energized closes its contact 39 to energize the trip circuit 48 and thereby trips circuit breakers 9 to 15, inclusive.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. In an electrical system comprising a bus bar supplied with N-phase electric energy from a plurality of power source lines through a plurality of circuit breakers associated one with each line, a current transformer in each of at least N−1 phases of each power source line, a plurality of electric relays associated one with each of said current transformers, an auxiliary contact means on each of said electric relays, an overcurrent relay associated with each of said current transformers, an operational winding on each of said electric relays, a plurality of additional opposed windings on each relay, said opposed windings of each relay having the same number of turns and being wound on a common core, connections for electrically connecting each of said current transformers to an associated one of said overcurrent relays and to said operational winding and one of said opposed windings of an associated one of said electric relays to supply thereto an electric current proportional to the current in their single phase-associated power source line, connections for electrically connecting a different one of said opposed windings of each relay associated with a particular phase in series electric circuit with each other and to said current transformers associated with said particular phase to supply to said different opposed windings an electric current proportional to the sum of the particular phase currents supplied to said bus bar, a tripping circuit for said circuit breakers, a control circuit electrically connected through said auxiliary contact means of said electric relays to a source of direct current to energize said control circuit in response to operation of said electric relays for an electric fault on said bus bar, an auxiliary relay having an operating coil in series electric circuit in said control circuit to be energized in response to energization of said control circuit, a pair of normally open contacts on said auxiliary relay, and connections for electrically connecting said tripping circuit through said normally open contacts of said auxiliary relay to a source of direct current to trip said circuit breakers in response to an electric fault on said bus bar and prevent tripping of said circuit breakers for an electric fault external to said bus bar whereby directional protection of said system is provided for an electrical fault on said bus bar.

2. In an electric system comprising a plurality of phase-associated power source lines electrically connected each through an associated circuit breaker to supply electric power to a common bus bar, a plurality of current transformers electrically connected one in each power source line and forming a group of phase-associated current transformers, a plurality of electric relays each associated with a particular of said current transformers and its associated power source line and forming a group of phase-associated electric relays, an auxiliary contact means on each of said electric relays, an operational winding and a plurality of opposed windings on each of said electric relays, a plurality of overcurrent relays each having an operational winding, connections for electrically connecting a particular one of said opposed windings of each electric relay in a first series electric circuit, connections for electrically connecting said current transformers to said first series electric circuit to supply thereto an electric current proportional to the sum of the currents in phase-associated power source lines, connections for electrically interconnecting said operational winding of each of said overcurrent relays, said operational winding of each of said electric relays and a different one of said opposed windings of each of said electric relays to form a plurality of additional series electric circuits and for electrically connecting each of said additional series electric circuits to an associated one of said current transformers to supply to each of said additional series electric circuits thus formed an electric current proportional to the current in a single associated one of said power source lines, a tripping circuit arranged to trip said circuit breakers in response to energization of said tripping circuit, a control circuit electrically connected in a predetermined relation through said auxiliary contact means of said electric relays to a source of direct current to energize said control circuit in response to operation of said electric relays for an electrical fault on said bus bar and to prevent energization of said control circuit for an electrical fault on said power source lines, an auxiliary relay in series circuit in said control circuit to be energized in response to energization of said control circuit, auxiliary contacts on said auxiliary relay, and connections for electrically connecting said tripping circuit through said auxiliary relay contacts to a source of direct current to trip said circuit breakers in response to energization of said auxiliary relay whereby directional protection of said system is provided for an electrical fault on said bus bar.

3. In an electric system comprising a plurality of phase-associated power source lines electrically connected each through an associated circuit breaker to supply electric power to a common bus bar, a plurality of current transformers electrically connected one in each power source line and forming a group of phase-associated current transformers, a plurality of electric relays each associated with a particular one of said current transformers and its associated power source line and forming a group of phase-associated electric relays, an operational winding and a plurality of opposed windings on each of said electric relays, a plurality of overcurrent relays each having an operational winding, connections for electrically connecting a particular one of said opposed windings of each electric relay in a first series electric circuit, connections for electrically connecting said current transformers to said first series electric circuit to supply thereto an electric current proportional to the sum of the currents in phase-associated power source lines, connections for electrically interconnecting said operational winding of each of said overcurrent relays, said operational winding of each of said electric relays and a different one of said opposed windings of each of said electric relays to form a plurality of additional series electric circuits and for electrically connecting each of said additional series electric circuits to an associated one of said current transformers to supply to each of said additional series electric circuits thus formed an electric current proportional to the current in a single associated one of said power source lines, an electric control circuit comprising an auxiliary relay having an operating coil, a pair of normally closed contacts and a pair of normally open contacts for each of said overcurrent relays, a pair of normally closed contacts for said electric relays, and connections for electrically interconnecting said contacts of said overcurrent relays, said contacts of said electric relays and said operating coil of said auxiliary relay in a predetermined series parallel relation and for connecting said control circuit to a source of direct current to energize said auxiliary relay in response to an electric fault of predetermined value on said bus bar and to prevent energization thereof for an electrical fault on said power source lines, and a trip circuit comprising a pair of normally open contacts of said auxiliary relay, a trip coil for each of said circuit breakers and connections for electrically connecting said trip coils through said auxiliary relay contacts to a source of direct current to trip said circuit breakers to open position in response to operation of said auxiliary relay by said control circuit.

4. In an electric system comprising a plurality of phase-associated power source lines electrically connected each through an associated circuit breaker having a trip coil and arranged to supply electric power to a common bus bar, a plurality of current transformers each having a primary winding and a secondary winding and electrically connected one in each of said power source lines, a plurality of directional electric relays each associated with a particular one of said current transformers and its associated power source line, an operational winding and a plurality of opposed windings on each of said relays, a pair of normally closed contacts on each of said electric relays, a plurality of overcurrent relays each having an operational winding, a pair of normally closed and a pair of normally open contacts, an auxiliary relay having an operating coil and a pair of normally open contacts, connections for electrically connecting a particular one of said opposed windings of each of said electric relays in a first series electric circuit, connections for electrically connecting said secondary windings of said current transformers to said first series electric circuit to supply thereto a current proportional to the sum of the currents in said power source lines, connections for electrically connecting said operational windings of said overcurrent relays and said electric relays and a different one of said opposed windings of said electric relays to the secondary winding of their associated one of said current transformers to receive therefrom a current proportional to the current in an associated one of said power source lines, connections for electrically connecting said operating winding of said auxiliary relay, said pairs of normally open and normally closed contacts of said overcurrent relays, and said normally closed contacts of said electric relays in a predetermined circuit relation and to a source of direct current to energize said auxiliary relay to close said normally open contact thereof only for an electric fault of predetermined value on said bus bar, and connections for electrically connecting said normally open contact of said auxiliary relay and said trip coils of said circuit breakers in a series parallel electric circuit and to a source of direct current to operate said trip coils to open said circuit breakers in response to energization of said auxiliary relay whereby directional protection of said system is provided for an electrical fault on said bus bar.

ANDREW J. McCONNELL.

REFERENCES CITED

The following references are of record in the file of this patent:

UNITED STATES PATENTS

| Number | Name | Date |
| --- | --- | --- |
| 795,182 | Wilson | July 18, 1905 |
| 848,932 | Fjare | Apr. 2, 1907 |
| 1,699,096 | Caldwell | Jan. 15, 1929 |
| 2,111,101 | Leyburn | Mar. 15, 1938 |